United States Patent [19]

Adorjan et al.

[11] Patent Number: 4,521,002
[45] Date of Patent: Jun. 4, 1985

[54] SERIES SPRING SHOCK ABSORBERS

[75] Inventors: Jon M. Adorjan, Glen Ellyn; Michael H. Kobiske, St. Charles; Michael P. Astorino, Naperville, all of Ill.

[73] Assignee: Maremont Corporation, Carol Stream, Ill.

[21] Appl. No.: 473,578

[22] Filed: Mar. 9, 1983

[51] Int. Cl.³ .............................................. B60G 15/02
[52] U.S. Cl. .................................... 267/8 R; 267/60; 267/170
[58] Field of Search ................. 267/8 R, 22 A, 22 R, 267/34, 33, 4, 64.15, 60, 61 R, 61 S, 62, 58, 166, 168, 169, 170–176, 178, 179, 177; 188/321.11, 322.16, 322.19; 280/668, 712

[56] References Cited

U.S. PATENT DOCUMENTS

| | | | |
|---|---|---|---|
| 2,408,254 | 9/1946 | DuPont | 267/8 R |
| 2,475,774 | 7/1949 | Benson | 267/8 R X |
| 2,865,651 | 12/1958 | Chayne et al. | 280/712 |
| 2,902,274 | 9/1959 | McIntyre | 267/8 R |
| 2,917,303 | 12/1959 | Vierling | 267/8 R |
| 3,160,406 | 12/1964 | Dickinson | 267/8 R |
| 3,503,601 | 3/1970 | Wells | 267/170 X |
| 4,159,105 | 6/1979 | Vander Laan et al. | 267/8 R |
| 4,431,092 | 2/1984 | Kloster | 188/322.19 X |

FOREIGN PATENT DOCUMENTS

| | | | |
|---|---|---|---|
| 163163 | 3/1954 | Australia | 267/8 R |
| 1024390 | 2/1958 | Fed. Rep. of Germany | 267/8 R |
| 2239444 | 2/1973 | Fed. Rep. of Germany | 267/60 |

Primary Examiner—Douglas C. Butler
Attorney, Agent, or Firm—Allegretti, Newitt, Witcoff & McAndrews, Ltd.

[57] ABSTRACT

An improved, spring-assisted shock absorber. Springs are mounted in series between spring retainers fixed on the cylinder exterior, and a spring guide slidably mounted on a sleeve protector to the cylinder exterior.

2 Claims, 2 Drawing Figures

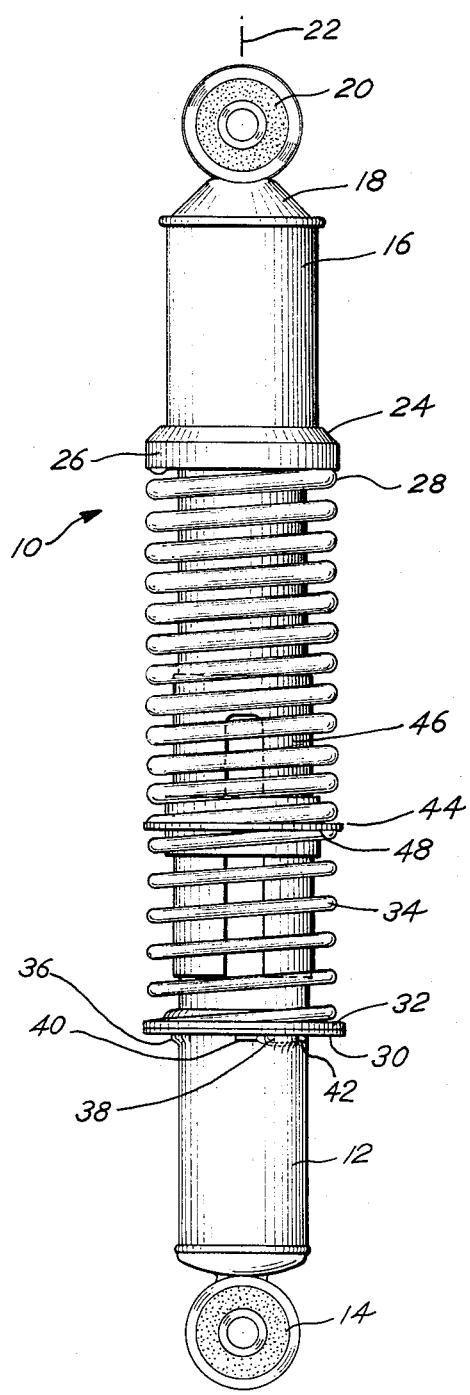
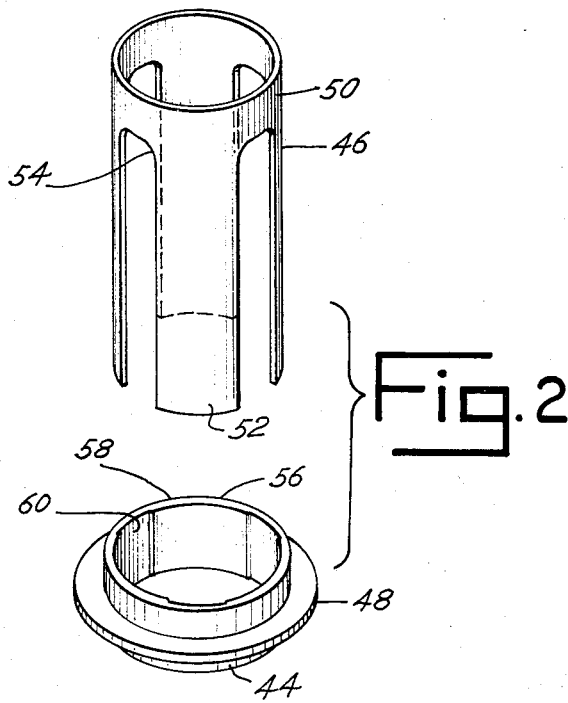

SERIES SPRING SHOCK ABSORBERS

BACKGROUND OF THE INVENTION

This invention relates to a shock absorber, and more particularly, to a spring-assisted shock absorber of particular construction.

Spring assisted shock absorbers were originally developed for passenger vehicles to provide better vehicle leveling characteristics while carrying a rear vehicle load. Such shock absorbers each included a single load carrying spring. Because of the typically large mass of older vehicles, the single load carrying spring provided an acceptably comfortable ride in an unloaded vehicle, even though the spring rate was relatively high.

With the advent of the currently typical small vehicle, however, conventional single spring assisted shock absorbers often resulted in a harsh ride in an unloaded vehicle.

SUMMARY OF THE INVENTION

In a principal aspect, the present invention is an improved spring-assisted shock absorber.

This spring-assisted shock absorber has a tubular exterior and comprises a shock absorber cylinder subassembly with a cylinder exterior, a shock absorber piston subassembly slidably mounted to the cylinder, with a piston rod exterior, a first spring retainer on the piston rod exterior, a second spring retainer on the cylinder exterior, a sleeve protector on the tubular exterior between the spring retainers, a spring guide slidably on the sleeve protector, a first spring between the first spring retainer and the spring guide, and a second spring between the spring guide and the second spring retainer.

This shock absorber was developed to provide a low spring rate for an unloaded small vehicle and a higher spring rate for the small vehicle when loaded. The higher spring rate is beyond the spring rate range capabilities of a typical single spring rear booster with a variable rate spring. The two springs are located in series (end-to-end) to support a load, and their total spring rate $R_C$ is as follows:

$$R_C = (R_1 \times R_2)/(R_1 + R_2),$$

where $R_1$ is the spring rate of the first spring and $R_2$ is the spring rate of the second spring.

The spring assisted shock absorber of this invention, also called a dual spring booster, preferably uses a long first spring and a short second spring. When both springs are operating on an unloaded vehicle, the total spring rate $R_C$ is in effect. Because this total spring rate is relatively low, the resultant ride in the unloaded vehicle is good. As the vehicle is loaded, the two springs in series become shorter. The short spring will bottom out or be fully collapsed long before the long spring approaches its fully collapsed length. When this occurs, the short spring, in effect, is no longer a spring, and is merely a spacer between the first spring and the second spring retainer. Some only the long spring is now acting as a spring the total spring rate $R_C$ is significantly increased, and is equal to the rate $R_1$ of the first spring.

Spring sets may be developed to suit individual families of vehicles. Initial designs show a rate increase that more than doubles (e.g., 25 lb./in.—56 lb./in.), compared to a typical single variable rate spring range of about 10 lb./in. (e.g., 28 lb./in.—38 lb./in.).

BRIEF DESCRIPTION OF THE DRAWING

One particular embodiment of the present invention is illustrated in the accompanying drawings wherein:

FIG. 1 is a perspective view of the preferred embodiment; and

FIG. 2 is a perspective view of a sleeve protector and spring guide of the preferred embodiment.

DETAILED DESCRIPTION OF THE PREFERRED EMBODIMENT

Referring to FIG. 1, the preferred embodiment of the invention is an improved, spring-assisted shock absorber 10 of specific construction and detail. The shock absorber 10 includes a conventional internal construction, and for clarity, attention is directed to its exterior.

An intermediate tube or cylinder 12 surmounts a first shock fastener ring 14. The cylinder 12 is part of a cylinder subassembly. A dust tube, or outer cylinder 16 is mounted to a dust tube cap 18 and thereby to a piston subassembly (not shown) including a piston and piston rod. With the piston, rod and cap 18, the outer cylinder 16 is telescopically or slidably movable relative to the intermediate cylinder 12 and the rest of the cylinder subassembly. A second shock fastener ring 20 surmounts the dust tube cap 18. The cylinders 12 and 16 are cylindrical, each includes a cylindrical exterior and together with other components, they define both the cylinder exterior and a longitudinal axis 22 of the shock absorber 10.

A first or upper, annular, spring retainer 24 is fixed on the dust tube 16, remote from the dust tube cap 18. The first retainer 24 is radially enlarged in comparison to the dust tube 16, and provides an annular lower surface of a radially outwardly projecting, circumferentially extending first spring end flange 26 for abutment by and retention of a longitudinally extending, first helical coil spring 28. The step bored upper surface of retainer 24 abuts the lower edge portion of tube 16 and is held in contact by the pressure of springs 28 and 34. A second or lower, annular, spring retainer 30 is fixed on the intermediate cylinder 12, remote from the ring 14. The second retainer 30 is radially enlarged like the first retainer 24. It provides a annular, upper surface of a radially outwardly projecting, circumferentially extending, second spring end retainer flange 32, for abutment by and retention of a longitudinally extending, second helical coil spring 34.

The second retainer 30 is held on the intermediate cylinder 12 by the force of springs 28, 34 against three (or more) circumferentially spaced, radially outwardly projecting dimples, e.g., 36, 38, on the cylinder 12. The retainer 30, along its inner edge, is keyed, such that the retainer 30 is slipped on the cylinder 12, after the springs 28, 32, and the spring guide 44 past the dimples. The retainer 30 is then rotated approximately 60°, and released to come to rest against the dimples. Downwardly extending ledges, e.g., ledges 40, 42, prevent the retainer 30 from rotating, and the pressure of the springs 28, 34 holds the retainer 30 in place.

Between the lower end of the first spring 28, and the upper end of the second spring 34, an annular spring guide 44 is slidably mounted on a sleeve protector 46 to the intermediate cylinder 12. The spring guide 44 includes a third radially outwardly projecting, circumferentially extending spring end retaining flange 48, for abutment by, retention of, and sliding guidance of the springs 28, 34.

The sleeve protector 46 is press fit on the intermediate cylinder 12 before the cylinder subassembly and piston and rod subassembly are joined. The guide 44 is placed on the shock absorber exterior after the spring 28, and before the spring 34 and retainer 30.

Referring to FIG. 2, the sleeve protector 46 includes a circumferentially continuous, longitudinally abbreviated, collar portion 50. A longitudinally extending finger portion of four (or more) identical fingers, e.g., finger 52, circumferentially separated by interposed, identical, slots 54, completes the sleeve protector 46.

An inner, annular, guide mounting portion 56 of the guide 44 extends longitudinally through the flange 48. The inner surface 58 of the portion 56 is keyed, like the retainer 30, with three (or more) guide slots, e.g., slot 60, to slip past the dimples, e.g., 36, 38. The inner surface 58 of the spring guide 44 rides over the sleeve protector slots 54 and fingers 52. The slots 60 and fingers 52 do not engage each other, because of their difference in number. The guide 44 does not contact the cylinder 12.

As most preferred, the guide 44 and sleeve protector 46 are both formed of Delrin.

The lower spring 34 is substantially shorter than the upper spring 28. The springs 28, 34 are in series, with the compression of each acting to compress the other, through the sliding guide 44. Thus, the springs 28, 34 act as described in the foregoing Summary Of The Invention.

The invention and the preferred embodiment are now described in such full, clear, concise and exact terms as enable any person skilled in the art to which the invention pertains, to make and use the same. By description of the preferred embodiment, the best mode contemplated by the inventors of carrying out their invention is set forth. To particularly point out and distinctly claim the subject matter regarded as invention, the following claims conclude this specification.

What is claimed is:

1. A spring-assisted shock absorber assembly comprising:
    a shock absorber intermediate cylinder subassembly including an intermediate cylinder, with a cylindrical, intermediate cylinder exterior,
    a shock absorber dust tube, the dust tube being slidably mounted to the shock absorber intermediate cylinder subassembly, with the dust tube having a dust tube exterior;
    a first, annular, spring retainer fixed on the dust tube exterior and including a radially outwardly projecting, circumferentially extending, first spring end retaining flange;
    a second, annular, spring retainer fixed on the intermediate cylinder exterior and including a radially outwardly projecting, circumferentially extending, second spring end retainer flange;
    an annular sleeve protector including an annular collar and a plurality of longitudinally elongated, circumferentially spaced fingers extending from the collar and defining longitudinally extending, circumferentially spaced sleeve protection slots therebetween, the sleeve protection slots extending fully through the sleeve protector, the sleeve protector being press fit on the intermediate cylinder exterior between the spring retainers;
    an annular spring guide including an annular guide mounting portion and a third radially outwardly projecting, circumferentially extending spring end retaining flange, the spring guide longitudinally slidably mounted on the sleeve protector with the guide mounting portion riding over the sleeve protector slots and the fingers;
    a first coil spring having a first spring rate $R_1$ mounted on the shock absorber assembly and retained between the first spring end retaining flange of the first spring retainer and the third spring end retaining flange of the spring guide; and
    a second coil spring having a second spring rate $R_2$ less than the first spring rate $R_1$ mounted on the shock absorber assembly and retained between the second spring end retaining flange of the second spring retainer and the third spring end retaining flange of the spring guide;
    the combined spring rate $R_C$ of the first and second springs equaling $(R_1 \times R_2)/(R_1 + R_2)$ and upon full compression of the second spring, because the second spring ceases to act as a spring, the combined spring rate $R_C$ equaling the first spring rate $R_1$; and
    the springs being guided in movement, as the shock absorber assembly expands and contracts, by the spring guide.

2. A spring-assisted shock absorber as in claim 1 in which the intermediate cylinder includes a plurality of outwardly projecting dimples; in which the second spring retainer defines guide slots which key the second spring retainer, the second spring retainer being slippable onto the intermediate cylinder past the dimples and rotatable and releasable to rest against the dimples; in which the annular guide mounting portion of the annular spring guide is keyed to slip onto the intermediate cylinder past the dimples; and in which the springs hold the second spring retainer against the dimples.

* * * * *

UNITED STATES PATENT AND TRADEMARK OFFICE
CERTIFICATE OF CORRECTION

PATENT NO. : 4,521,002

DATED : June 4, 1985

INVENTOR(S) : Jon M. Adorjan, Michael H. Kobiske, and Michael P. Astorino

It is certified that error appears in the above-identified patent and that said Letters Patent is hereby corrected as shown below:

Column 1, line 61, delete "Some" and substitute --Since--;

Column 1, line 62, after "spring" (1st occurrence) insert --,--;

Column 2, line 44, delete "a annular" and substitute --an annular--.

Signed and Sealed this

Eighth Day of October 1985

[SEAL]

Attest:

Attesting Officer

DONALD J. QUIGG

Commissioner of Patents and Trademarks—Designate